March 13, 1956 C. E. McCORMICK 2,738,155
GLARE SHIELD MOUNTING BRACKET
Filed May 3, 1951
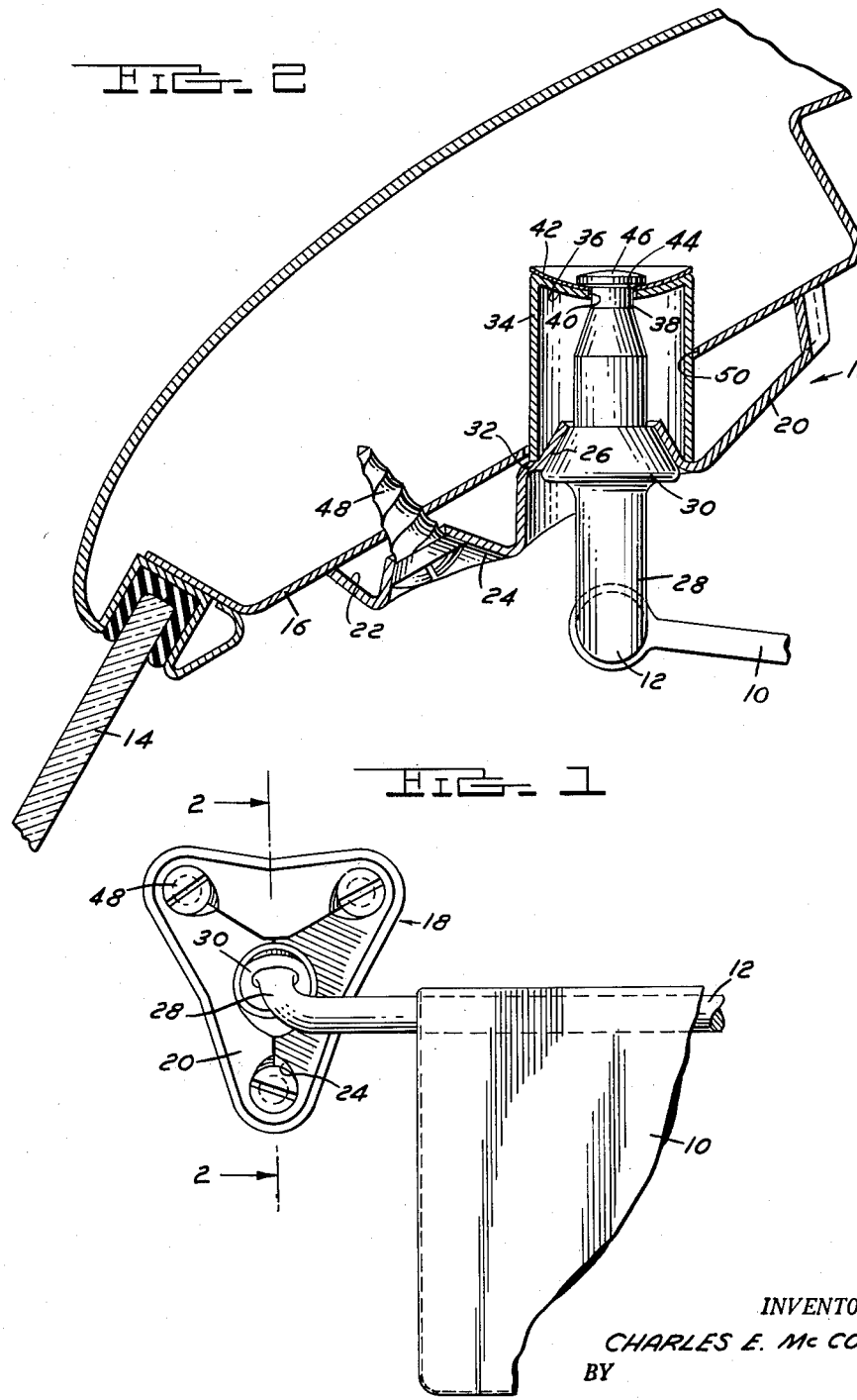
INVENTOR.
CHARLES E. McCORMICK
BY
Barnes, Kisselle, Laughlin & Raisch
ATTORNEYS

United States Patent Office 2,738,155
Patented Mar. 13, 1956

2,738,155

GLARE SHIELD MOUNTING BRACKET

Charles E. McCormick, Dearborn, Mich., assignor to Vogt Manufacturing Corporation, Rochester, N. Y.

Application May 3, 1951, Serial No. 224,299

2 Claims. (Cl. 248—289)

This invention relates to a glare shield mounting bracket and more particularly to a bracket and arm assembly for mounting a glare shield on the header of an automobile over the windshield.

It is an object of this invention to provide a mounting bracket for a glare shield which lends itself admirably to sheet metal fabrication.

A further object of the invention resides in the provision of a glare shield mounting bracket which is economical to manufacture and which is of simple but rigid construction.

Referring to the drawings wherein the preferred construction of my glare shield bracket and arm assembly is illustrated, Fig. 1 is a fragmentary sectional view of an automobile header having the glare shield mounting bracket of this invention secured thereto.

Fig. 2 is a fragmentary plan view of the glare shield and mounting bracket therefor.

Referring to the drawings and particularly to Fig. 1 there is shown a glare shield 10 which is pivotally supported on an arm 12 which in one position extends horizontally above the windshield 14. Arm 12 is pivotally secured to the automobile header 16 by bracket 18. The arrangement illustrated in Fig. 1 is such that arm 12 and glare shield 10 can be pivoted in a substantially horizontal plane from the position shown above the windshield and in front of the passenger to a position at one side of the passenger.

Bracket 18 is formed of sheet metal and is preferably stamped to form a somewhat triangularly-shaped base plate 20 which is reinforced by a peripheral flange 22. Base plate 20 is stamped to provide screw-receiving sockets 24 at each corner of bracket 18 for securing the assembly to the header 16 of the automobile. At approximately the center of the bracket 18 base plate 20 is fashioned with an inwardly tapered socket 26 the axis of which is inclined to the plane of plate 20 as is clearly shown in Fig. 2. Arm 12 is provided at one end thereof with a stub shaft portion 28 which extends generally perpendicular to the portion of arm 12 which supports glare shield 10. The stub shaft portion 28 is fashioned with an enlarged bearing member 30, this bearing member being frusto-conically shaped so as to seat nicely within the tapered socket 26.

It will be observed that on the back face of base plate 20 there is provided a substantially flat ridge or flange 32 surrounding the base of the tapered socket 26. On this ridge 32 there is positioned the open end of a tubular sleeve member 34. Sleeve 34 is dimensioned such that it seats firmly on ridge 32 and is maintained in a centered position with respect to stub shaft 28 by the conically shaped walls of socket 26. The opposite end of tubular member 34 is fashioned with an inwardly dished wall 36. The free end of stub shaft 28 is reduced as at 38 and projects through an opening 40 in end wall 36. These members are retained in the assembled position illustrated by a spring washer 42 which is centrally apertured as at 44, the extreme end of stub shaft portion 28 being peened over the washer 42 as at 46.

Tubular member 34 may be welded to the circular ridge portion 32 if desired, although I have found that welding of these members together is not necessary. Spring washer 42 is preferably stamped from flat sheet stock, preferably spring steel. By forming washer 42 of flat spring sheet material, I have found that the tension to which the washer is subjected in assembly can be regulated very closely.

Bracket 18 is adapted to be mounted on header 16 by screws 48 seated in sockets 24, with the tubular sleeve 34 projecting upwardly through an opening 50 in header 16.

In glare shields of this type it is important that the shield be mounted in a manner such that it will not readily move out of adjusted position and, at the same time, the shield must be sufficiently free to move such that it can be swung in a horizontal plane from one position to another with but little effort. The ease with which the glare shield 10 can be pivoted with arm 12 about bracket 18 depends, of course, upon the friction between the bearing member 30 and the walls of the conically shaped socket 26. This friction is in turn controlled by the force with which stub shaft portion 28 is pulled in a direction inwardly of socket 26 by spring 42. I have found through experimentation that, by controlling the extent to which the end wall 36 is dished and by peening the end 46 of the stub shaft portion over washer 42 such that the washer is pulled into dish shape and against the outer face of end wall 36, the amount of tension in the washer can be controlled within the limits desired. With this arrangement end wall 36 forms a stop which determines the tension under which washer 42 is placed. If in a particular style of glare shield it is found that swinging the glare shield and arm 12 horizontally from one position to another requires too much effort, the wall 36 is dished out to a lesser extent so that when washer 42 is pulled into engagement therewith the washer will be dished to a lesser extent and the tension therein will likewise be less, thus reducing the friction between the relatively movable parts of the arm 12 in bracket 18.

It will also be observed that the end wall 36 and tapered socket 26 cooperate to provide two bearing supports spaced axially of the stub shaft 28. These spaced bearing supports prevent tilting of the arm when it is swung horizontally from one position to another.

Thus it will be seen that I have provided a bracket and arm assembly for a glare shield which lends itself readily to manufacture from sheet metal. The bracket 18 may be formed by a simple stamping operation, and the provision of the spring washer 42 together with the end wall 36 of the tubular member 34 provides a simple and economical means whereby the resistance to swinging of the glare shield support arm 12 can be controlled to a desired value. The assembly is furthermore very rigid and the spaced bearing supports, that is, the tapered socket 26 and the end wall 36, serve to effectively prevent tilting of the support arm relative to the mounting bracket 18.

I claim:

1. A bracket for mounting a glare shield on the header of an automobile, said bracket being formed of sheet metal and comprising a base plate adapted to be mounted on the header of the automobile above the windshield, said base plate having an opening therethrough, said base plate being struck inwardly around said opening to form a generally frusto-conically shaped socket surrounding said opening, an arm for supporting the glare shield, said arm having a shank portion extending through said opening and having an enlarged portion seated in said socket, a tubular member having an inner diameter substantially greater than the shank portion of said arm and generally corresponding to the diameter of the larger end of said socket, said tubular member being seated at one end on the inner face of said base plate surrounding said socket, the opposite end of said tubular member being provided with a wall having an opening therein through which the free end portion of the shank of said arm extends, said free end portion of the arm being engaged by the edges of said opening in said wall to form a bearing for said free end portion of the arm and resilient means acting between said end wall and the free end portion of said shank to resiliently bias the enlarged portion of said arm into seating engagement with said socket.

2. The combination set forth in claim 1 wherein said wall at the end of said tubular member is dish shaped and wherein said resilient means comprises a resilient washer which is substantially flat in the untensioned position and which is maintained in coplanar engagement with said dish-shaped wall by the free end portion of said arm.

References Cited in the file of this patent

UNITED STATES PATENTS

| | | |
|---|---|---|
| 857,982 | Collins | June 25, 1907 |
| 2,112,464 | Jacobs | Mar. 29, 1938 |
| 2,336,044 | Stuart | Dec. 7, 1943 |
| 2,524,731 | Mattei | Oct. 3, 1950 |

FOREIGN PATENTS

| | | |
|---|---|---|
| 610,402 | Great Britain | Oct. 14, 1948 |